US008694647B2

(12) United States Patent
Bolosky et al.

(10) Patent No.: US 8,694,647 B2
(45) Date of Patent: Apr. 8, 2014

(54) READ-ONLY OPERATIONS PROCESSING IN A PAXOS REPLICATION SYSTEM

(75) Inventors: William J. Bolosky, Issaquah, WA (US); Randolph B. Haagens, Bellevue, WA (US); Norbert P. Kusters, Redmond, WA (US); Peng Li, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 264 days.

(21) Appl. No.: 13/051,964

(22) Filed: Mar. 18, 2011

(65) Prior Publication Data

US 2012/0239722 A1  Sep. 20, 2012

(51) Int. Cl.
G06F 15/16 (2006.01)
(52) U.S. Cl.
USPC ........... 709/227; 709/223; 719/321; 703/223; 703/226; 703/217
(58) Field of Classification Search
USPC ........... 709/223, 227; 719/321; 703/223, 226, 703/217
See application file for complete search history.

(56) References Cited

U.S. PATENT DOCUMENTS

| 5,165,031 | A * | 11/1992 | Pruul et al. | 714/25 |
|---|---|---|---|---|
| 5,363,505 | A * | 11/1994 | Maslak et al. | 718/100 |
| 6,463,532 | B1 | 10/2002 | Reuter et al. | |
| 7,113,980 | B2 | 9/2006 | Jacobs et al. | |
| 7,171,491 | B1 * | 1/2007 | O'Toole et al. | 709/244 |
| 7,249,280 | B2 * | 7/2007 | Lamport et al. | 714/11 |
| 7,334,154 | B2 * | 2/2008 | Lorch et al. | 714/4.4 |
| 7,565,433 | B1 * | 7/2009 | Lamport | 709/227 |
| 7,627,694 | B2 * | 12/2009 | Sreenivasan et al. | 709/251 |
| 7,711,825 | B2 * | 5/2010 | Lamport | 709/227 |
| 7,877,552 | B2 * | 1/2011 | Leveille et al. | 711/147 |
| 7,971,030 | B2 * | 6/2011 | O'Sullivan | 712/34 |
| 8,301,589 | B2 * | 10/2012 | Sen et al. | 707/610 |
| 8,589,574 | B1 * | 11/2013 | Cormie et al. | 709/230 |
| 2002/0035559 | A1 * | 3/2002 | Crowe et al. | 707/2 |
| 2002/0156719 | A1 * | 10/2002 | Finebaum et al. | 705/37 |
| 2005/0283644 | A1 * | 12/2005 | Lorch et al. | 714/4 |
| 2006/0248017 | A1 * | 11/2006 | Koka et al. | 705/59 |
| 2008/0071853 | A1 | 3/2008 | Mosier et al. | |
| 2008/0320247 | A1 * | 12/2008 | Morfey et al. | 711/154 |
| 2009/0119304 | A1 * | 5/2009 | Preslan et al. | 707/10 |
| 2009/0216910 | A1 * | 8/2009 | Duchesneau | 709/250 |

(Continued)

OTHER PUBLICATIONS

Jason Baker et al., Megastore: Providing Scalable, Highly Available Storage for Interactive Services, Jan. 9-12, 2011, (pp. 223-234).

(Continued)

Primary Examiner — Benjamin R Bruckart
Assistant Examiner — Clarence D McCray
(74) Attorney, Agent, or Firm — Henry Gabryjelski; Raghu Ghinagudabha; Micky Minhas

(57) ABSTRACT

Embodiments are directed to processing read-only operations without storing the operations persistently, determining a processing order for read-only requests, and to directing read-only requests to nodes best able to handle the requests. In an embodiment, a quorum leader receives various read-only requests. The quorum leader controls process ordering for replicas in the leader's quorum. The quorum leader determines an appropriate order for processing the read-only operations, without clock-based synchronization. The quorum leader sends the read-only request to an appropriate replica in the quorum and executes the read-only request at the appropriate replica without storing the operation persistently.

19 Claims, 4 Drawing Sheets

(56) References Cited

U.S. PATENT DOCUMENTS

2011/0047202 A1* 2/2011 Ellison et al. ............... 709/201
2012/0089861 A1* 4/2012 Cardinell et al. ............... 714/2
2012/0239722 A1* 9/2012 Bolosky et al. ............. 709/201

OTHER PUBLICATIONS

Jun Rao et al., Using Paxos to Build a Scalable, Consistent, and Highly Available Datastore, Mar. 1, 2011 (Retrieved Date), (pp. 243-254).
Leslie Lamport et al., Vertical Paxos and Primary-Backup Replication, Mar. 3, 2011 (Retrieved Date), (2 pages).
Yanhua Mao et al., Mencius: Building Efficient Replicated State Machines forWANs, Mar. 3, 2011 (Retrieved Date), (16 pages).
David Mazi'eres, Paxos Made Practical, Mar. 1, 2011 (Retrieved Date), (11 pages).
Gustavo M. D. Vieira et al., The Performance of Paxos and Fast Paxos, Mar. 1, 2011 (Retrieved Date), (14 pages).
Fault-scalable Byzantine Fault-tolerant Services, Michael Abd-El-Malek, et al., Oct. 23-26, 2005 http://www.pdfcmu.edu/PDL-FTP/PASIS/sosp05.pdf (16 pages).
Atul Adya, et al., FARSITE: Federated, Available, and Reliable Storage for an Incompletely Trusted Environment, Dec. 2002, http://citeseerx.istpsu.edu/viewdoc/download;sessionid=3FB77E5E0257A7890F268D09973CE4AF?doi=10.1.1.11.3814&rep=rep1&type=pdf, (14 pages).
Thomas E. Anderson, et al., Serverless Network File Systems, Dec. 1995, http://citeseerx.ist.psu.edu/viewdoc/download?doi=10.1.1.80.5867&rep=rep1&type=pdf (21 pages).
Lakshmi N. Bairavasundaram, et al., An Analysis of Data Corruption in the Storage Stack, Jan. 8, 2008 http://www.pdsi-scidac.org/publications/papers/schroeder-fast08.pdf (16 pages).
Mike Burrow, The Chubby Lock Service for Loosely-coupled Distributed Systems, Apr. 24, 2006 http://www.eecs.harvard.edu/cs262/Readings/chubby.pdf (14 pages).
George Candea, et al., Crash-only Software, May 2003 http://www.google.co.uk/url?sa=t&source=web&cd=5&ved=0CDOQFjAE&url=http%3A%2F%2Fciteseerx.ist.psu.edu%2Fviewdoc%2Fdownload%3Fdoi%3D10.1.1.90.9585%26rep%3Drep1%26type%3Dpdf&ei=KMpsTZONHKed4AaC3PW5BA&usg=AFQjCNEIGvFVd0hk-4-3MMk2LrzMXjXrww (6 pages).
George Candea, et al., Microreboot—A Technique for Cheap Recovery, OSDI'04: 6th Symposium on Operating Systems and Design and Implementation http://www.usenix.org/event/osdi04/tech/full_papers/candea/candea.pdf (pp. 31-44).
Pei Cao, et al., The TickerTAIP Parallel RAID Architecture, Nov. 1992 http://www.hpl.hp.com/techreports/92/HPL-92-151.pdf (22 pages).
Miguel Castro, et al., Practical Byzantine Fault Tolerance, Feb. 1999 http://www.pmg.csail.mit.edu/papers/osdi99.pdf (14 pages).
Tushar Chandra, et al., Paxos Made Live: An Engineering Perspective, Jun. 26, 2007 http://citeseerx.istpsu.edu/viewdoc/download?doi=10.1.1.116.9219&rep=rep1&type=pdf (16 pages).
James Cowling, et al., HQ Replication: A Hybrid Quorum Protocol for Byzantine Fault Tolerance, Nov. 2006 http://people.csail.mit.edu/cowling/hq/hq-osdi06.pdf (14 pages).
John R. Douceur, et al., Distributed Directory Service in the Farsite File System, OSDI'06: 7th USENIX Symposium on Operating Systems Design and Implementation http://citeseerx.ist.psu.edu/viewdoc/download?doi=10.1.1.100.9933&rep=rep1&type=pdf, (14 pages).
Sanjay Ghemawat, et al., The Google File System, Oct. 19-22, 2003 http://citeseerx.ist.psu.edu/viewdoc/download?doi=10.1.1.125.789&rep=rep1&type=pdf (15 pages).
John Henry Hartman, The Zebra Striped Network File System, 1994 http://citeseerx.ist.psu.edu/viewdoc/download?doi=10.1.1.49.467&rep=rep1&type=pdf (159 pages).

John H. Howard, et al., Scale and Performance in a Distributed File System, Feb. 1988 http://citeseerx.ist.psu.edu/viewdoc/download-?doi=10.1.1.71.5072&rep=rep1&type=pdf (31 pages).
Jeffrey Katcher, Postmark: A New File System Benchmark, Oct. 8, 1997 http://communities-staging.netapp.com/servlet/JiveServlet/download/2609-1551/Katcher97-postmark-netapp-tr3022.pdf (8 pages).
Ramakrishna Kotla, et al., Zyzzyva: Speculative Byzantine Fault Tolerance, Oct. 14-17, 2007 http://citeseerx.ist.psu.edu/viewdoc/download?doi=10.1.1.122.112&rep=rep1&type=pdf (15 pages).
John Kubiatowicz, et al., OceanStore: an Architecture for Global-scale Persistent Storage, Nov. 2000 http://citeseerx.ist.psu.edu/viewdoc/download?doi=10.1.1.38.1044&rep=rep1&type=pdf (12 pages)
Leslie Lamport, The Part-time Parliament, May 1998, http://research.microsoft.com/en-us/um/people/lamport/pubs/lamport-paxos.pdf (33 pages).
Leslie Lamport, Paxos Made Simple, Nov. 1, 2001 http://citeseerx.ist.psu.edu/viewdoc/download?doi=10.1.1.69.3093&rep=rep1&type=pdf (14 pages)
Leslie Lamport, et al., The Byzantine Generals Problem, Jul. 1982 http://citeseerx.ist.psu.edu/viewdoc/download?doi=10.1.1.12.1697&rep=rep1&type=pdf (20 pages)
Butler W. Lampson, The ABCD's of Paxos, 2001 Principles of Distributed Computing Conference http://citeseerx.ist.psu.edu/viewdoc/download?doi=10.1.1.67.80&rep=rep1&type=pdf (17 pages) .
Edward K. Lee, et al., Petal: Distributed Virtual Disks, 1996 http://citeseerx.ist.psu.edu/viewdoc/download?doi=10.1.1.122.8832&rep=rep1&type=pdf (9 pages).
Jacob R. Lorch, et al., The SMART Way to Migrate Replicated Stateful Services, Apr. 18-21, 2006 http://citeseerx.ist.psu.edu/viewdoc/download?doi=10.1.1.73.1298&rep=rep1&type=pdf (13 pages) .
John MacCormick, et al., Boxwood: Abstractions as the Foundation for Storage Infrastructure, OSDI '04: 6th Symposium on Operating Systems Design and Implementation http://citeseerx.ist.psu.edu/viewdoc/download?doi=10.1.1.134.8940&rep=rep1&type=pdf (16 pages).
Dushyanth Narayanan, et al., Everest: Scaling Down Peak Loads through I/O Off-loading, Proceedings of 8th USENIX Symposium on Operating Systems Design and Implementation (Osdi '08) http://www.usenix.org/event/osdi08/tech/full_papers/narayanan/narayanan_html/ (22 pages).
Edmund B. Nightingale, et al., Cycles, Cells and Platters: An empirical analysis of hardware failures on a million commodity PCs, Apr. 10-13, 2011 http://research.microsoft.com/pubs/144888/eurosys84-nightingale.pdf (14 pages).
Brian Masao Oki, Viewstamped Replication for Highly Available Distributed Systems, Aug. 1988 http://publications.csail.mit.edu/lcs/pubs/pdf/MIT-LCS-TR-423.pdf (103 pages).
Mendel Rosenblum, et al., The Design and Implementation of a Log-structured File System, Feb. 1992 http://www.cs.toronto.edu/~demke/469F.06/Handouts/p26-rosenblum.pdf (27 pages).
Chris Ruemmler, et al., An Introduction to Disk Drive Modeling, Mar. 17-29, 1994 http://citeseerx.ist.psu.edu/viewdoc/download;jsessionid=557F2E04B535AAF9B42FE6E662C71351?doi=10.1.1.117.39&rep=rep1&type=pdf (19 pages).
Yasushi Saito, et al., FAB: Building Distributed Enterprise Disk Arrays from Commodity Components, Oct. 7-13, 2004 http://citeseerx.ist.psu.edu/viewdoc/download?doi=10.1.1.1.2631&rep=rep1&type=pdf (11 pages).
Implementing Fault-tolerant Services using the State Machine Approach: A Tutorial http://citeseerx.ist.psu.edu/viewdoc/download?doi=10.1.1.69.1536&rep=rep1&type=pdf (21 pages).
Bianca Schroeder, et al., DRAM Errors in the Wild: A Large-scale Field Study, Jun. 15-19, 2009 http://citeseerx.ist.psu.edu/viewdoc/download?doi=10.1.1.148.9610&rep=rep1&type=pdf (12 pages).
SCSI Primary Commands—3 (SPC-3). May 4, 2005 http://www.13thmonkey.org/documentation/SCSI/spc3r23.pdf (496 pages).

(56) References Cited

OTHER PUBLICATIONS

Chandramohan A. Thekkath, et al., Frangipani: A Scalable Distributed File System, Proceedings of the 16th ACM Symposium on Operating Systems Principles 1997 http://citeseerx.ist.psu.edu/viewdoc/download?doi=10.1.1.41.3241&rep=rep1&type=pdf (14 pages).

R.M. Tomasulo, An Efficient Algorithm for Exploiting Multiple Arithmetic Units, IBM Journal, Jan. 1967 http://citeseerx.ist.psu.edu/viewdoc/download?doi=10.1.1.129.4915&rep=rep1&type=pdf (9 pages).

Avishay Traeger, et al., A Nine Year Study of File System and Storage Benchmarking, Received May 2007; revised Nov. 2007; accepted Nov. 2007, ACM Transactions on Storage, vol. 4, No. 2, Article 5, Publication date: May 2008. http://citeseerx.ist.psu.edu/viewdoc/download?doi=10.1.1.77.4042&rep=rep1&type=pdf (51 pages).

Bruce L. Worthington, et al., Scheduling Algorithms for Modern Disk Drives, May 1994, pp. 241-251 http://www.ece.cmu.edu/~ganger/papers/sigmetrics94.pdf (11 pages).

Jian Yin et al., Separating Agreement from Execution for Byzantine Fault Tolerant Services, Oct. 19-22, 2003 http://www.cs.utexas.edu/~lorenzo/papers/sosp03.pdf (15 pages).

* cited by examiner

READ-ONLY OPERATIONS PROCESSING IN A PAXOS REPLICATION SYSTEM

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to run on distributed computing systems. These distributed computing systems may include databases, distributed processor arrays, or other distributed computing systems. These systems may be operated using the Paxos algorithm or protocol ("Paxos" herein). Paxos may be used to ensure that each processor or computer node in a cluster is processing data in the proper order, and that each node maintains the same state. In this manner, individual computers in a Paxos system may fail, but no operations will be lost during the failure. Each read and write operation is written to disk before it is processed. This ensures that no operations are lost, but also results in high overhead.

BRIEF SUMMARY

Embodiments described herein are directed to processing read-only operations without storing the operations persistently, determining a processing order for read-only requests, and to directing read-only requests to nodes best able to handle the requests. In one embodiment, a quorum leader receives various read-only requests. The quorum leader controls process ordering for replicas in the leader's quorum. The quorum leader determines an appropriate order for processing the read-only operations, without clock-based synchronization. The quorum leader sends the read-only request to an appropriate replica in the quorum and the replica executes the read-only request without storing the operation persistently.

In another embodiment, a quorum leader receives various read-only requests. The quorum leader controls process ordering for replicas in the leader's quorum. The quorum leader determines an appropriate order for processing the read-only operations, without clock-based synchronization. The determined order indicates an appropriate execution slot number for the read-only operation. The quorum leader adds an indication to the read-only operation indicating that the operation is to be executed no earlier than the determined execution slot number. The quorum leader also sends the read-only request and the determined execution slot number to an appropriate replica in the quorum and the replica executes the read-only request without storing the operation persistently.

In yet another embodiment, a quorum leader receives various read-only requests. The quorum leader controls process ordering for replicas in the leader's quorum. The quorum leader determines an appropriate order for processing the read-only operations, without clock-based synchronization. The quorum leader determines which replicas are best able to handle the read-only requests and sends the read-only request to a replica that is determined to be best able to handle the read-only request. The replica best able to handle the request then executes the read-only request without storing the operation persistently.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
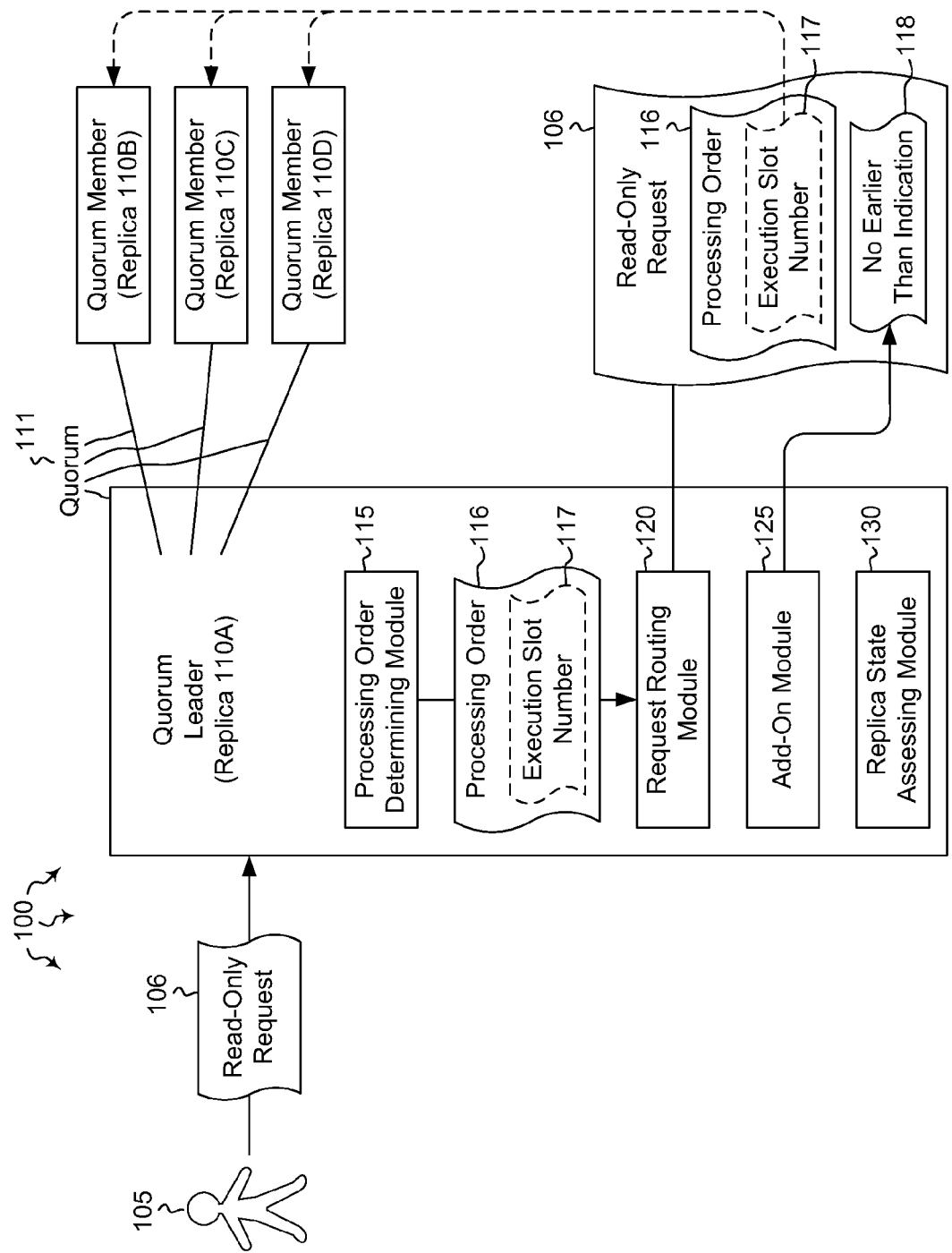
FIG. 1 illustrates a computer architecture in which embodiments of the present invention may operate including processing read-only operations without storing the operations persistently.

Embodiments described herein are directed to processing read-only operations without storing the operations persistently, determining a processing order for read-only requests, and to directing read-only requests to nodes best able to handle the requests. In one embodiment, a quorum leader receives various read-only requests. The quorum leader controls process ordering for replicas in the leader's quorum. The quorum leader determines an appropriate order for processing the read-only operations, without clock-based synchronization. The quorum leader sends the read-only request to an appropriate replica in the quorum and the replica executes the read-only request without storing the operation persistently.

In another embodiment, a quorum leader receives various read-only requests. The quorum leader controls process ordering for replicas in the leader's quorum. The quorum leader determines an appropriate order for processing the read-only operations, without clock-based synchronization. The determined order indicates an appropriate execution slot number for the read-only operation. The quorum leader adds an indication to the read-only operation indicating that the operation is to be executed no earlier than the determined execution slot number. The quorum leader also sends the read-only request and the determined execution slot number to an appropriate replica in the quorum. The replica executes the read-only request without storing the operation persistently.

In yet another embodiment, a quorum leader receives various read-only requests. The quorum leader controls process ordering for replicas in the leader's quorum. The quorum leader determines an appropriate order for processing the read-only operations, without clock-based synchronization. The quorum leader determines which replicas are best able to handle the read-only requests and sends each read-only request to a replica that is determined to be best able to handle that read-only request. The replica best able to handle the request then executes the read-only request without storing the operation persistently.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmissions media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes multiple different computer systems including the members of quorum 111. The quorum may be a group or cluster of computers or processors working together to process inputs (e.g. read-only request 106 from user 105). While FIG. 1 illustrates quorum 111 as having four quorum members, the quorum may include substantially any number of quorum members. The quorum may be configured to process all types of requests including read-only requests and write requests. It should be noted that the term "write" may refer to "updating" or performing a "read-modify-write". The quorum may be configured as a replicated state machine (RSM). Replicated state machines may provide operating semantics, such that operations are fully serialized and durably committed by the time a result is returned. When implemented with the Paxos protocol, RSMs may tolerate arbitrary computer and process restarts, as well as permanent stopping faults of a minority of computers, with only weak assumptions about the underlying system.

When using an RSM, if a computation is deterministic, then it can be made fault-tolerant by running copies of it on multiple computers and feeding the same inputs in the same order to each of the replicas (e.g. replicas 110A, 110B, 110C and 110D). The Paxos protocol may be used to order the sequence of operations. Process order determining module 115 may be configured to determine an appropriate processing order for various different operation requests, including read-only request(s) 106. The determined processing order 116 may include an execution slot number 117 that indicates, for each operation, the order in which that operation is to be executed.

For example, when a quorum leader (e.g. leader 110A) receives a read request, it looks at the highest write request that is committed in sequence. A request is committed in sequence if at least half of the quorum members have logged it and have agreed to put the request in the execution slot, and the quorum leader has noted this. Thus, for example, the leader may assign slot numbers 1-5. Execution cannot occur until the operation is committed. If execution slots 1, 2, 4 and 5 are committed, but 3 is not, 2 would be the highest number committed in sequence. This determination of processing order may be performed without clock-based synchronization. That is, when determining the processing order for the data request, no synchronized (or unsynchronized) clocks are referenced. The processing order determining module 115 may also look at what operations have been previously agreed to for the old leader when a new quorum leader has been chosen. The previously agreed to operations may be incorporated into the new ordering.

Request routing module 120 may send the read-only request 106 to one or more of the quorum members for processing. In some cases, the request may be sent to a determined appropriate quorum member. For instance, replica state assessing module 130 may determine which replicas are currently available to process the data request (i.e. they are not receiving state in order to serve reads). Module 130 may determine which replicas are best able to process the request. This determination may include determining which replicas currently have a desired memory value in memory, determining which replica has a lower network or lower processor load than the other replicas, determining which replica is physically closest to the requesting client, or determining which replica can access the desired value most quickly. Many other factors may be used in determining which replica is best able to process the user's data request.

Request routing module 120 may thus route the read-only request 106 to the replica that is best able to process the request. The read-only request may include the determined processing order 116 (and the optional execution slot number), as well as a no-earlier-than indication 118. The no-earlier-than indication may be generated by add-on module 125 which is configured to add the no-earlier-than indication to the read-only request 106. The no-earlier-than indication may indicate to the replica that the data request is to be processed no earlier than a certain point (e.g. no earlier than a specified execution slot number). This provides flexibility in when the request is processed. Instead of specifying an exact processing order, read-only requests may be processed flexibly at some point, but no earlier than the point indicated in indication 118. The replica that then receives the read-only request may process the request without persistently storing the request. In this manner, the read-only request may be processed by the replica that is best able to handle the request, in a flexible manner, and without persistently storing the request. These concepts will be explained further below with regard to methods 200, 300 and 400 of FIGS. 2, 3 and 4, respectively.

Figure 2:
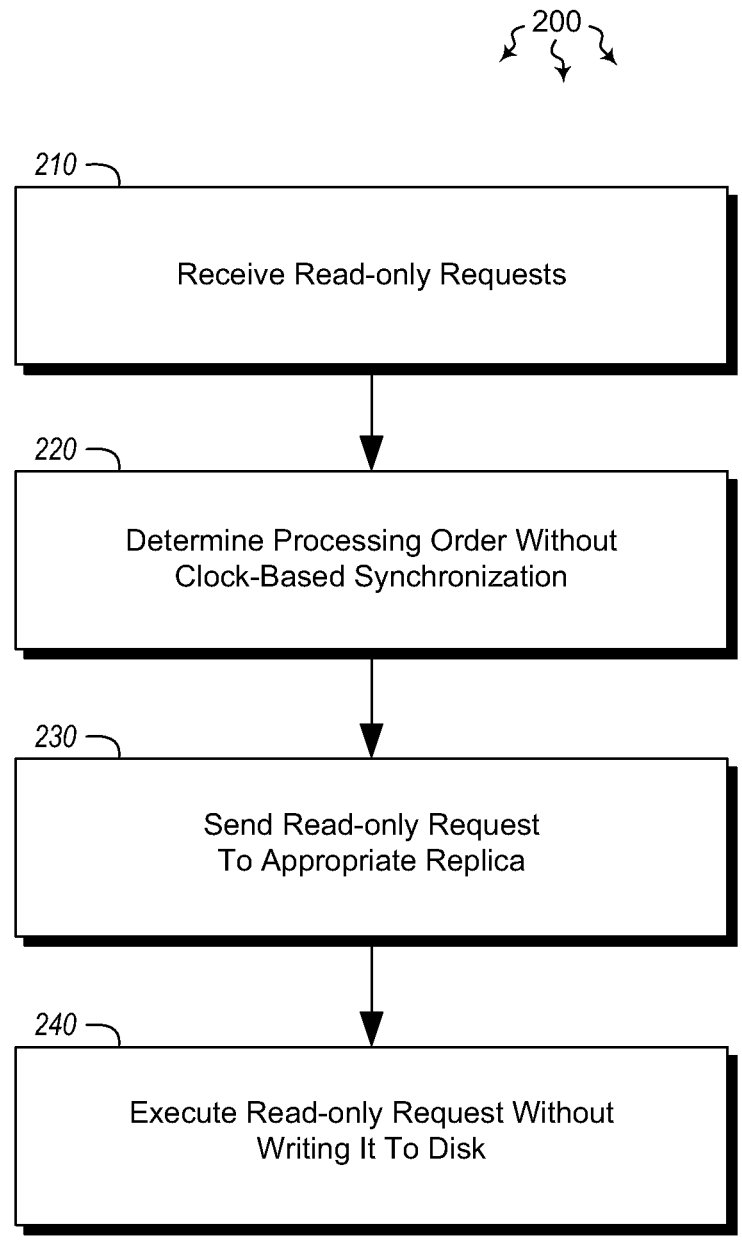
FIG. 2 illustrates a flowchart of an example method for processing read-only operations without storing the operations persistently.
Figure 3:
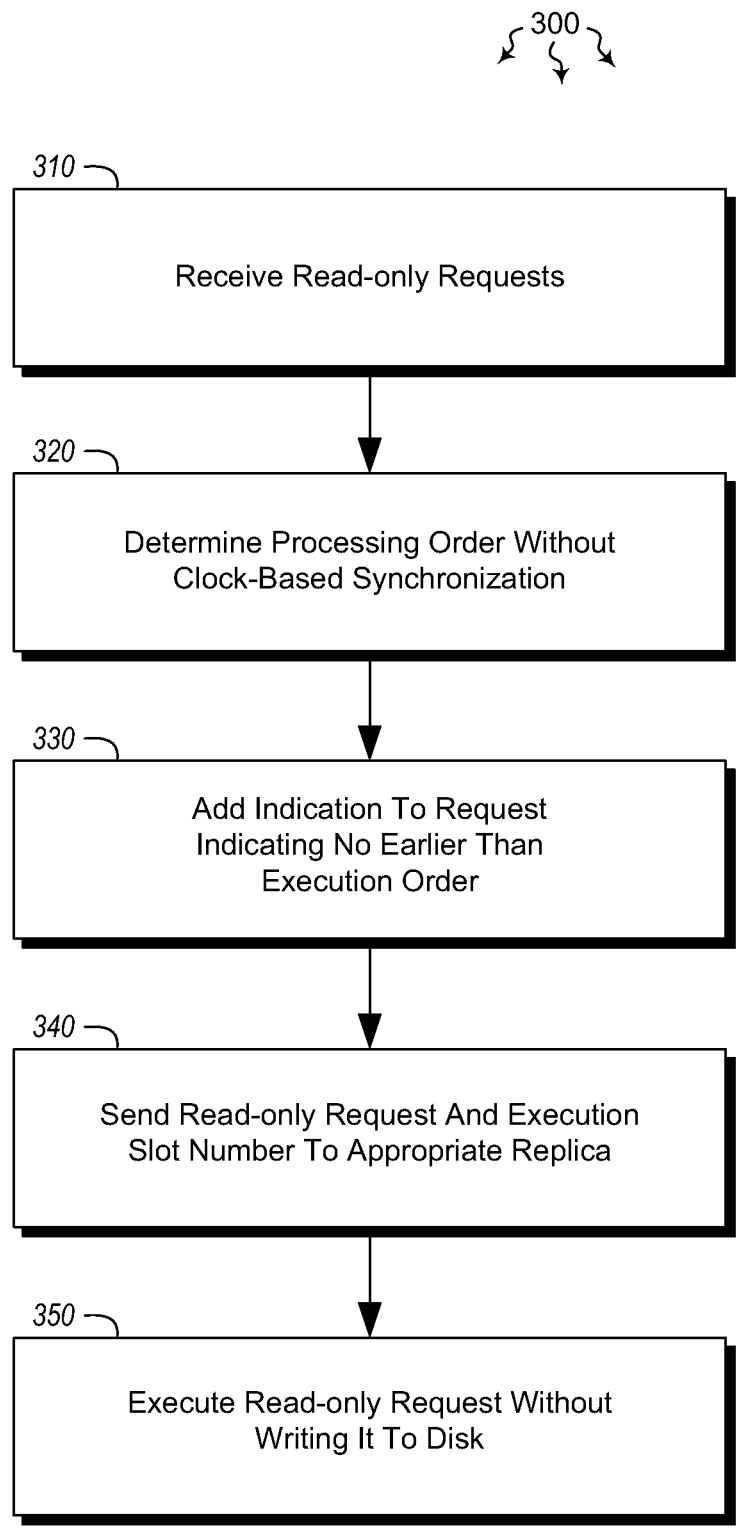
FIG. 3 illustrates a flowchart of an example method for determining a processing order for read-only requests.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for processing read-only operations without storing the operations persistently in a system that uses the Paxos protocol. The method 200 will now be described with frequent reference to the components and data of environment 100.

Method 200 includes an act of a quorum leader receiving one or more read-only requests, wherein the quorum leader controls process ordering for replicas in the quorum (act 210). For example, quorum leader 110A may receive read-only request 106 from user 105. The read-only request may be requesting that a portion of data be read and returned to the user. The quorum leader may be (at least temporarily) in charge of controlling process ordering for replicas 110B-110D in quorum 111. It will be appreciated that while four replicas are shown in FIG. 1, substantially any number of replicas may be in quorum 111. Leadership (and membership) in the quorum may change over time, with different replicas being leader at different points in time. In FIG. 1, replica 110A is the current leader of the quorum. Thus, replica 110A receives and processes requests from users.

Method 200 includes an act of determining an appropriate order for processing the read-only operations, the determination being performed without clock-based synchronization (act 220). For example, processing order determining module 115 may determine a processing order for the received read-only request(s) 106, without using clock-based synchronization in the determination. The processing order may indicate the order in which various operations are to be processed. For instance, some operations can only be performed after other operations have been completed. In other cases, the read-only option may be performed at a flexible time. In such cases, add-on module 125 may add a "no-earlier-than" indication 118 to the read-only request indicating that the request can be executed flexibly at some point, but no earlier than a specified point.

In some cases, the determined processing order 116 may further indicate an appropriate execution slot number 117 for the read-only operation 106. The determined execution slot number may be sent by the request routing module 120 to the determined appropriate replica in the quorum 111. Determining the appropriate processing order may include identifying the greater of the highest slot number that the leader has committed in sequence and the highest operation number that the leader has proposed. As explained above, a number is committed in sequence if at least half of the quorum members have logged it and have agreed to put the request in the execution slot. In one example, the leader may assign slot numbers 1-3. Execution cannot occur until the operation is committed. If execution slots 1 and 3 are committed, but 2 is not, 1 would be the highest number committed in sequence. Thus, the highest number committed in sequence may be used in determining an appropriate execution slot number 117. Additionally or alternatively, the highest number that the previous leader has proposed may be used to determine an appropriate execution slot number.

In some cases, determining an appropriate order for processing the read-only operations may identify and implement various disk-efficiency factors in the reordering determination. Thus, the processing order determining module 115 may look at factors such as where the data is stored on disk, or which data the immediately prior requests are accessing.

These and other disk-efficiency factors may be used to help module 115 make its ordering decisions.

To ensure that quorum leader 110A is still the leader, it may be configured to send messages to the replicas in the quorum to determine whether the replicas have recognized a new leader. If at least half of the replicas including the leader have replied that they still recognize the leader as the leader of the quorum at the time of receiving the messages, the leader may continue receiving and processing data requests. If, on the other hand, at least half of the replicas including the leader have replied that they do not recognize the leader as the leader of the quorum, the leader may discard any pending read-only requests and begin acting as a regular quorum member. The former leader may further indicate to the user that the user is to re-send their pending read-only requests. It should be noted that, at least in some cases, a quorum may comprise less than half of the computer systems in database cluster. Separate quorums may be used for read and write requests, and requests may be processed as long as any two quorums intersect.

Method 200 includes an act of sending the read-only request to a determined appropriate replica in the quorum (act 230). For example, request routing module 120 may send read-only request 106 to an appropriate replica (e.g. 110B, 110C or 110D). The replica may be determined by the replica state assessing module 130 to be the replica that is best able to handle the request. This will be explained in greater detail with regard to FIG. 4. The leader may be configured to continually and dynamically determine which replicas are best able to handle the read-only requests and may send the read-only requests to those replicas.

Method 200 includes an act of executing the read-only request at the determined appropriate replica without storing the operation persistently (act 240). For example, the read-only request may be processed by any one of the nodes in the quorum 111, and may be performed without storing the operation persistently. The read-only request will be executed according to the processing order determined in act 220. If, for instance, the leader 110A determined that replica 110C was to be used to process the read-only request, the request would be sent to replica 110C. Replica 110C would then perform the read-only operation and send the results to computer user 105. In this manner, a read-only request may be executed on a specifically and dynamically chosen replica, in a Paxos system, without persistently storing the data request.

FIG. 3 illustrates a flowchart of a method 300 for determining a processing order for read-only requests. The method 300 will now be described with frequent reference to the components and data of environment 100.

Method 300 includes an act of a quorum leader receiving one or more read-only requests, wherein the quorum leader controls process ordering for replicas in the quorum (act 310). For example, quorum leader 110A may receive read-only request 106 from user 105. The quorum leader may be configured to receive and process all types of requests from the user including read-only requests, write requests or read/write requests.

Method 300 further includes an act of determining an appropriate order for processing the read-only operations, wherein the determined order indicates an appropriate execution slot number for the read-only operation, the determination being performed without clock-based synchronization (act 320). For example, processing order determining module 115 may determine processing order 116 for read-only request(s) 106. The processing order may indicate an execution slot number 117 for the operations. As mentioned above, module 115 may make the ordering determination without referencing a synchronous or other clock.

The current leader 110A may send messages to the other replicas in the quorum to determine whether the replicas have recognized a new leader. If at least half of the replicas including the leader have replied that the replicas still recognize the leader as the leader of the quorum, the leader will continue processing read-only requests. If at least half of the replicas including the leader have replied that they do not recognize the leader as the leader of the quorum, the read-only request may be discarded, and the leader may indicate to the user that the user is to re-send the read-only request. Add-on module 125 may add a no-earlier-than indication 118 to the read-only operation 106 indicating that the operation is to be executed no earlier than the determined execution slot number 118 (act 330). This type of execution allows multiple different data requests to be ordered in a flexible manner so that at least some of the data requests can be processed when it's most convenient, and not according to a strict process ordering.

Method 300 includes an act of sending the read-only request and the determined execution slot number to a determined appropriate replica in the quorum (act 340). For example, request routing module 120 may route read-only request 106 to whichever quorum replica was determined to be appropriate. The replica that receives this request (any of replicas 110A-D) may execute the request without storing the operation persistently (act 350). The read-only request will be executed according to the processing order determined in act 320. In this manner, read-only operations may be flexibly processed when tagged with a no-earlier-than indication. Moreover, the request(s) may be processed without storing the operations persistently, even when using the Paxos protocol.

Figure 4:
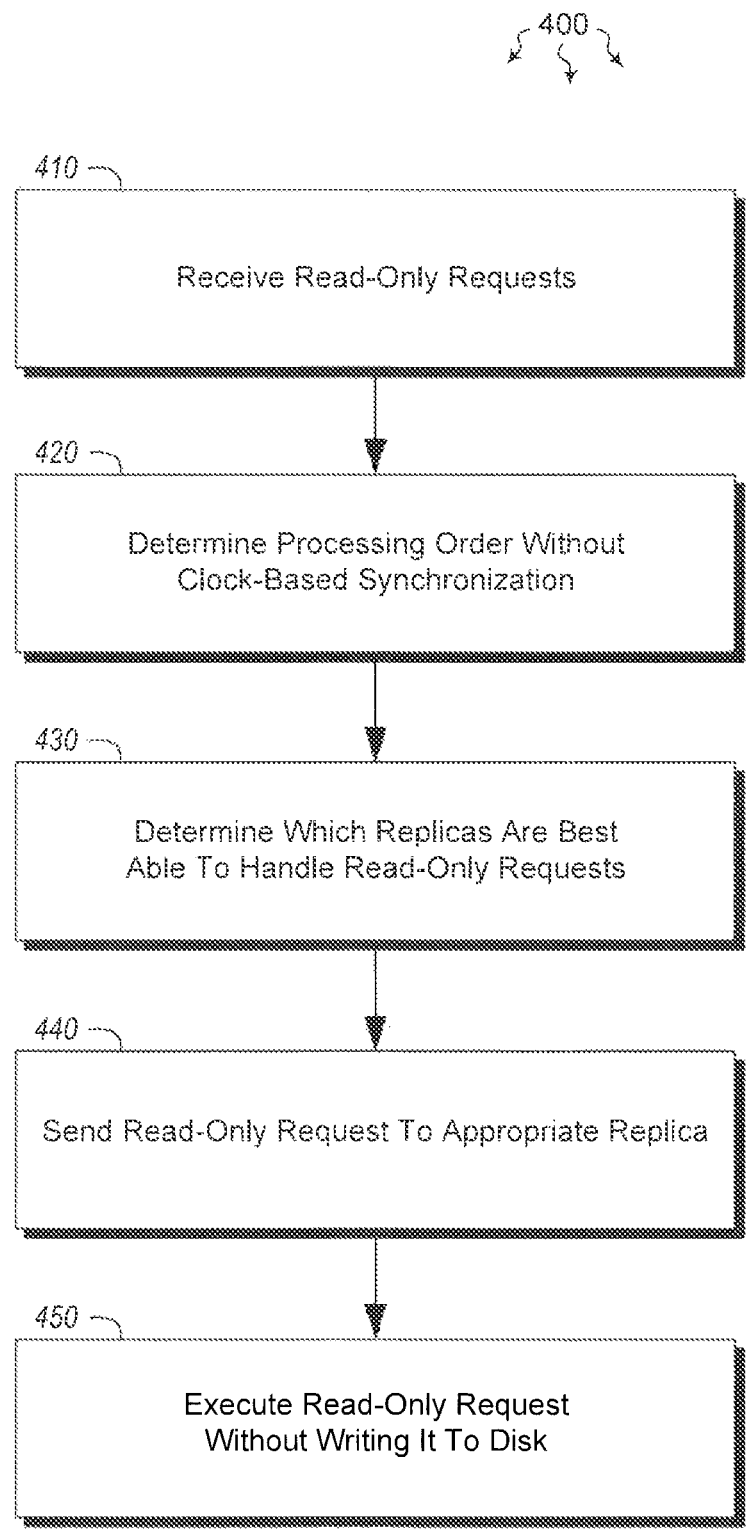
FIG. 4 illustrates a flowchart of an example method for directing read-only requests to nodes best able to handle the requests.

FIG. 4 illustrates a flowchart of a method 400 for directing read-only requests to nodes best able to handle the requests. The method 400 will now be described with frequent reference to the components and data of environment 100.

Method 400 includes an act of a quorum leader receiving one or more read-only requests from a requesting client, wherein the quorum leader controls process ordering for replicas in the quorum (act 410). For example, quorum leader 110A may receive read-only request(s) 106 from client 105. Processing order determining module 115 may determine an appropriate order 116 for processing the read-only operations (act 420). The determination may be performed without clock-based synchronization. Replica state assessing module 130 may determine which replicas are best able to handle the read-only requests (act 430).

For example, determining which replicas are best able to handle the read-only requests may include determining which replicas are currently writing data to disk. Replicas that are currently writing data to disk (or are otherwise using their processing resources) may not be the nodes that are best able to process the data requests. The determination may also look at which replicas currently have a desired memory value in memory. If that desired value is already loaded, it may save time and may indicate that that node is the optimal choice for processing the request. The determination may further look at which replica has a lower network load or which replica has a lower processor load than the other replicas. The node with the lowest load in each area (or at least most areas) may be selected as the best node. Still further, the determination may look at which replica is physically closest to the requesting client. Reducing distance may reduce communication and overall processing time, thus attributing to the node's overall desirability. While the above examples are provided, one skilled in the art will appreciate that many different factors (alone or in combination) may be used in determining which node is best able to process an incoming data request.

Method 400 also includes an act of sending the read-only request to a replica that is determined to be best able to handle the read-only request (e.g. one of replicas 110A-D) (act 440). The replica that is selected to process the read-only request may execute the request without writing the request to disk (act 450). The read-only request will be executed according to the processing order determined in act 420. In this manner, read-only requests may be processed on the quorum member that is best able to handle the request. Moreover, the read-only request may be processed without persistently storing the request, even in a system that utilizes the Paxos protocol.

In some cases, methods 300 and 400 may be combined, such that a no-earlier-than indication may be added to the read-only operation indicating that the operation is to be executed no earlier than a determined execution slot number. The read-only request may then be executed at the replica determined to be best able to handle the read-only request, according to the no-earlier-than execution order and without persistently storing the read-only request.

Accordingly, methods, systems and computer program products are provided which process read-only operations without storing the operations persistently. Moreover, methods, systems and computer program products are provided which determine a flexible processing order for read-only requests and direct read-only requests to nodes best able to handle the requests.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method for managing replication and storage of data by processing read-only operations without storing the operations persistently in a distributed computer system being operated under a Paxos-type protocol, the computer-implemented method comprising acts of:

in a distributed computing system, identifying a plurality of computer systems that serve as quorum members for storing replication data, and identifying one of the quorum members as a quorum leader designated to control process ordering for data to be replicated and stored among the quorum members;

the quorum leader receiving a read-only request;

the quorum leader determining an appropriate order defined by a determined execution slot for processing the read-only request, the quorum leader determining the appropriate order without clock-based synchronization by performing the following:

determining a highest write request that is committed in sequence by reason of at least half the quorum members having logged the write request and having agreed to put the write request in the execution slot; and the quorum leader noting that the highest write request has been committed in sequence by at least half the quorum members;

the quorum leader determining that one of the quorum members should serve as an appropriate replica that is determined to be best able to process the received read-only request;

the quorum leader sending the read-only request to the determined appropriate replica; and executing the read-only request at the determined appropriate replica by processing a read-only operation of the request without storing the operation persistently.

2. The method of claim 1, further comprising sending the results of the executed read-only request to a computer user.

3. The method of claim 1, wherein the determined processing order further indicates an appropriate execution slot number for the read-only operation.

4. The method of claim 3, further comprising sending the determined execution slot number to the determined appropriate replica in the quorum.

5. The method of claim 3, wherein determining the appropriate processing order comprises identifying the greater of the highest slot number that the quorum leader has committed in sequence and the highest operation number that a previous quorum leader proposed.

6. The method of claim 3, further comprising adding an indication to the read-only operation indicating that the operation is to be executed no earlier than the determined execution slot number.

7. The method of claim 1, further comprising sending a message to the quorum members to determine whether the quorum members have recognized a new leader.

8. The method of claim 7, further comprising determining that at least half of the quorum member, including the quorum leader, have replied that the quorum members still recognize the quorum leader as the leader of the quorum.

9. The method of claim 7, further comprising:

determining that the quorum members do not recognize the quorum leader as the leader of the quorum;

discarding the read-only request; and indicating to the user that the user is to re-send the read-only request to a new quorum leader.

10. The method of claim 1, wherein determining an appropriate order for processing the read-only operations identifies and implements disk-efficiency factors.

11. The method of claim 1, wherein the quorum leader determines several quorum members that are best able to handle the read-only request and sends the read-only request to those quorum members.

12. A computer program product comprising one or more physical memory device having stored thereon computer-executable instructions that, when executed by one or more processors of the computing system, cause the computing system to perform a computer-implemented method for managing replication and storage of data by processing read-only operations without storing the operations persistently in a distributed computer system being operated under a Paxos-type protocol, where the computer-implemented method comprises acts of:

in a distributed computing system, identifying a plurality of computer systems that serve as quorum members for storing replication data, and identifying one of the quorum members as a quorum leader designated to control process ordering for data to be replicated and stored among the quorum members;

the quorum leader receiving a read-only request;

the quorum leader determining an appropriate order defined by a determined execution slot for processing an operation for the read-only request, the quorum leader determining the appropriate order without clock-based synchronization by performing the following:

determining a highest write request that is committed in sequence by reason of at least half the quorum members having logged the write request and having agreed to put the write request in the execution slot; and the quorum leader noting that the highest write request has been committed in sequence by at least half the quorum members;

the quorum leader adding a no-earlier-than indication to the operation for the read-only request indicating that the operation is to be executed no earlier than the determined execution slot number;

the quorum leader determining that one of the quorum members should serve as an appropriate replica that is determined to be best able to process the read-only request;

the quorum leader sending the read-only request and the determined execution slot number and no-earlier-than indication to the appropriate replica; and executing the read-only request at the determined appropriate replica by processing the operation for the read-only request, based on the slot number and the no-earlier-than indication, and without storing the operation persistently.

13. The computer program product of claim 12, where the method further comprises the quorum leader sending a message to the quorum members determine whether a new quorum leader has been recognized.

14. The computer program product of claim 13, where the method further comprises determining that at least half of the quorum members including the quorum leader have replied that the quorum members still recognize the quorum leader as the leader of the quorum.

15. The computer program product of claim 13, where the method further comprises:
determining that the quorum members do not recognize the quorum leader as the leader of the quorum;
discarding the read-only request; and
indicating to the user that the user is to re-send the read-only request to a newly recognized quorum leader.

16. A computer program product comprising one or more physical memory device having stored thereon computer-executable instructions that, when executed by one or more processors of the computing system, cause the computing system to perform a computer-implemented method for managing replication and storage of data by processing read-only operations without storing the operations persistently in a distributed computer system being operated under a Paxos-type protocol, where the computer-implemented method comprises acts of:
in a distributed computing system, identifying a plurality of computer systems that serve as quorum members for storing replication data, and identifying one of the quorum members as a quorum leader designated to control process ordering for data to be replicated and stored among the quorum members;
the quorum leader receiving a read-only request;
the quorum leader determining an appropriate order defined by a determined execution slot for processing an operation for the read-only request, the quorum leader determining the appropriate order without clock-based synchronization by performing the following:
determining a highest write request that is committed in sequence by reason of at least half the quorum members having logged the write request and having agreed to put the write request in the execution slot; and the quorum leader noting that the highest write request has been committed in sequence by at least half the quorum members;

the quorum leader adding a no-earlier-than indication to the operation for the read-only request indicating that the operation is to be executed no earlier than the determined execution slot number;

the quorum leader determining that one of the quorum members should serve as an appropriate replica that is determined to be best able to process the read-only request;

the quorum leader then sending messages to the quorum members to determine whether the quorum members have recognized a new quorum leader, and
if not, sending the read-only request and the determined execution slot number and no-earlier-than indication to the appropriate replica, and then executing the read-only request at the determined appropriate replica by processing the read-only operation of the request, based on the slot number and the no-earlier-than indication, and without storing the operation persistently; and
if so, discarding any pending read-only request and the quorum leader then acting as a regular quorum member.

17. The computer program product of claim 16, wherein determining which quorum member is best able to handle the read-only request comprises determining which quorum members are currently writing data to disk.

18. The computer program product of claim 16, wherein determining which quorum member is best able to handle the read-only request comprises determining which quorum members currently have a desired memory value in memory.

19. The computer program product of claim 16, wherein determining which quorum members is best able to handle the read-only request comprises determining which quorum member has at least one of a lower network and a lower processor load than the other replicas.

* * * * *